UNITED STATES PATENT OFFICE.

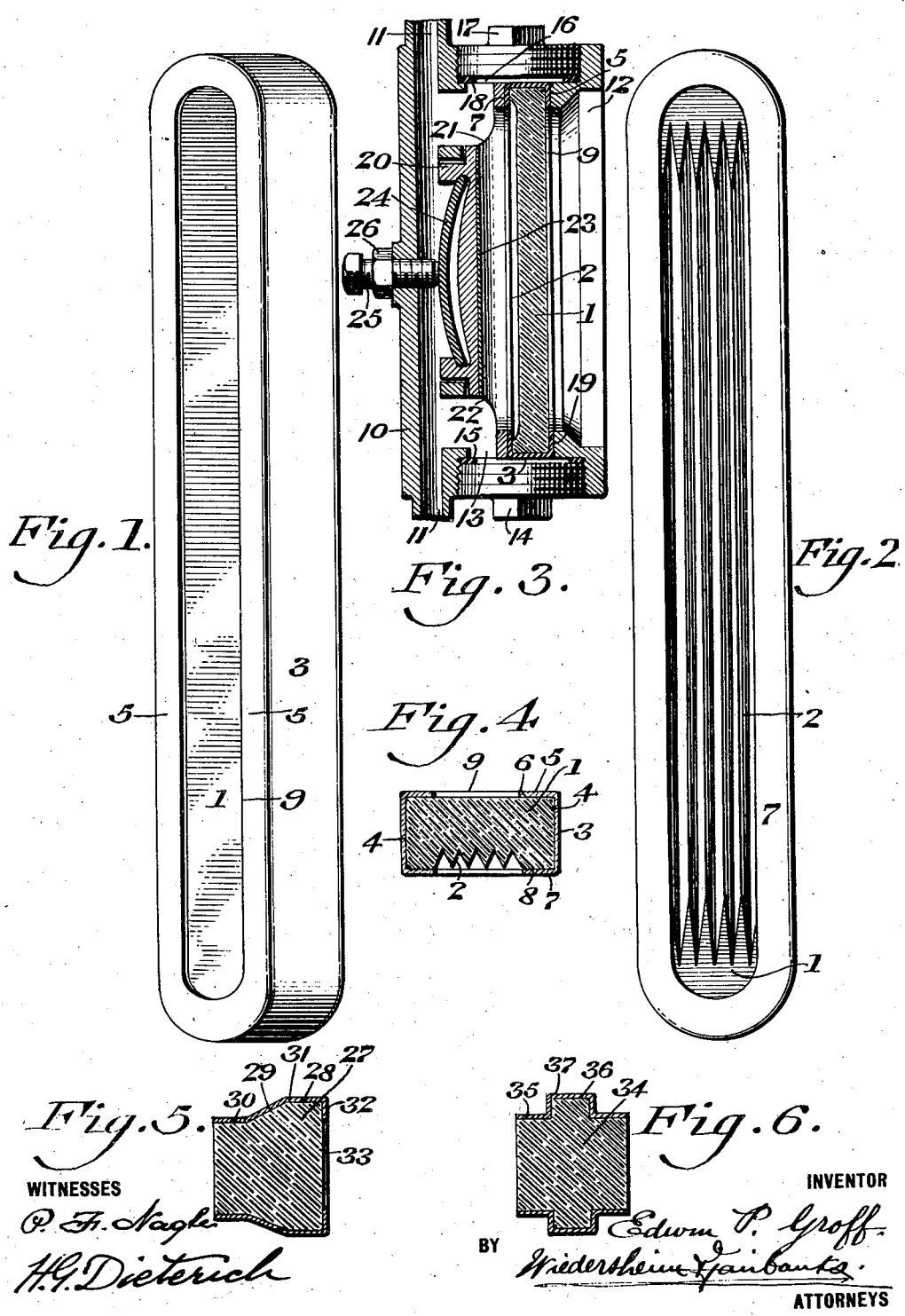

EDWIN P. GROFF, OF HADDON HEIGHTS, NEW JERSEY.

GAGE-GLASS FOR REGISTERING DEVICES.

1,183,872.

Specification of Letters Patent. Patented May 23, 1916.

Application filed April 28, 1911. Serial No. 623,844.

*To all whom it may concern:*

Be it known that I, EDWIN P. GROFF, a citizen of the United States, residing in Haddon Heights and county of Camden, State of New Jersey, have invented a new and useful Gage-Glass for Registering Devices, of which the following is a specification.

In devices heretofore employed for registering the height of a fluid, considerable difficulty has arisen, especially in cases wherein the registering device is used in connection with boilers generating high pressure steam, due to the cutting or erosive action of the high pressure steam moving at a high velocity through the registering device. If a leak occurs it is generally between the glass and its joint and the cutting action of the steam and hot water leaking through such openings soon scores and cuts the glass to such an extent that the same becomes useless and it is necessary to insert a new glass. Considerable difficulty and annoyance has also arisen in prior devices with which I am familiar, owing to the fact that the packing material which forms the joint, has a different co-efficient of expansion from that of the glass itself or the casing so that the packing or sealing material forming the joint adheres to the glass or to the casing and as the expansion and contraction occurs the packing is torn from its seat to such an extent as to permit leakage. Difficulty has also arisen owing to the fact that the fluid being registered, especially in cases where steam is present, causes the chipping and breaking of the sides of the glass so that it has been impossible to retain the original thickness of the glass for any length of time and this changing of thickness of the glass requires numerous adjustments of the means employed for securing the glass in assembled position.

In the ordinary construction of fluid gages considerable annoyance and expense has arisen owing to the deterioration of the means employed for forming a fluid tight seal between the glass and its casing and also due to the fact that the action of the heat and of the water and steam not only causes the deterioration of the packing material forming the joint but also tends to dissolve the glass itself with consequent reduction in efficiency and increase in cost of maintenance. As the glass wears away, difficulty arises in maintaining the proper engagement of the glass with its seat or gasket.

In order to overcome the difficulties above enumerated which arise in practice, I have devised a novel glass for registering purposes which is incased or enshrouded in such a manner as to materially increase the life of the glass and prevent, in a great measure, the destructive action of the fluid.

My invention further consists of a novel manner of incasing the glass to increase the life thereof and to provide means for forming a double seal of the glass with its casing and the means for securing the glass in assembled position with respect thereto.

My invention further consists of a novel construction of an incased glass in which the ends and sides are coated either by mechanical methods or electrical deposition with a material which will enshroud the ends and sides of the glass and the entire glass with the exception of the reflex surface and the sight portion in alinement therewith, such material being capable of resisting the cutting action of the steam, water and heat.

It further consists of other novel features of construction, all as will be hereinafter fully set forth.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a metal incased glass embodying my invention, the same being viewed from a point in view of the front face thereof. Fig. 2 represents an elevation of my novel device, the same being viewed from the rear face. Fig. 3 represents a sectional elevation of a fluid gage showing the manner in which the gage glass is secured when used in connection with one well known type of water gage. Fig. 4 represents a transverse section of the metal incased glass. Figs. 5 and 6 represent sectional elevations of different forms of bull's-eye glasses showing the manner in which the same are incased.

Similar numerals of reference indicate corresponding parts in the figures.

Referring to the drawings: In order to more clearly set forth one manner in which my novel glass may be assembled with respect to the gage frame, I have shown the same in Fig. 3 in assembled position with respect to a well known type of water gage frame, but to the construction of such frame I make no claim, since the same *per se* forms no part of my present invention and is but one way of using my novel type of gage glass.

1 designates the glass, which in Figs. 1, 2, 3 and 4 is shown as substantially rectangular in form but having its ends rounded. The rear face of the glass is provided with grooves 2, thereby forming a reflex face.

3 designates a coating which covers not only the sides of the glass but also a portion of the side and end faces 4, the coating being bent around as indicated at 5, in order to engage the front face 6 of the glass, and this coating is also bent around as is indicated at 7 in order to engage the rear face 8 of the glass so that the glass is incased or enshrouded with the exception of the reflex portion 2, and the sight portion 9. This coating 3 may be applied to the glass in any desired manner and may be mechanically applied or the same may be electrically deposited thereon, and in case a metal coating is employed, such as copper, it is preferably electrically deposited, while if I employ a coating such as lead, the same may be mechanically applied. This coating 3 may be of any suitable material and is preferably a material which is comparatively soft relatively to the glass itself so that when the glass is placed in position, the coating 3 will fill the space between the glass and its seat and cause a fluid tight seal to be formed at such point.

My novel construction of incased glass is shown in Fig. 3 in assembled position, wherein 10 designates a frame provided with extensions 11 leading therefrom, and provided with a sight opening 12. The frame is also provided with an opening 13 which is closed by means of a nut 14, a packing ring 15 of any desired material being placed between the nut and its seat so as to form a fluid tight joint at such point. The opposite end of the casing is provided with an opening 16 closed by a nut 17, and a packing ring 18 is also employed to form a fluid tight joint between the nut and the frame.

Surrounding the sight opening on its inner face is a seat 19 with which the forward portion 5 of the coating 3 is adapted to be in contact to form a fluid tight seal at such point.

20 designates a sealing member, the forward face of which is seated against the rear face 7 of the nut in order to form a fluid tight seal, it being noted that the member 20 has openings 21 and 22 so that the fluid may pass in rear of the glass 1. The inner face of the sealing member 20 is provided with a suitable coating 23 which forms a background for the glass, and such coating may be painted thereon or chemically deposited.

The rear face of the member 20 forms a seat for the spring 24 which abuts against an adjustable member 25 carried by the frame and secured in adjusted position by means of a nut 26 which also prevents leakage at such point. It will be seen from the above that in the type of frame seen in Fig. 3, the gage glass is yieldingly retained against its seat, and a double seal is formed, both on the front and rear face of the glass while the sides or outer portion of the glass are protected from the action of the acid in the water, as is evident and also from the disintegrating action of the steam, which in devices of this character causes a great deal of trouble and necessitates frequent adjustment of the fastening means.

My novel manner of incasing the glass is not limited to use with a gage glass of the type shown in Figs. 1 to 4 inclusive, but may be used in conjunction with any desired form or type of glass which is used in connection with registering or indicating mechanism and in Figs. 5 and 6 I have shown a type of glass known as the bull's-eye. In Fig. 5, 27 is the glass, the outer periphery of which has varying diameters 28, 29 and 30 with which the coating 31 is in intimate contact, said coating being bent around the front face of the glass as indicated at 32, so as to cover the same with the exception of the sight opening 33.

In the form shown in Fig. 6, 34 is the glass having different diameters 35 and 36 which are covered by a coating material 37, but in this embodiment I have not shown the coating material as extending over the ends of the glass 34.

By the employment of an incased glass, a constant thickness of glass at all times is provided, and a double seal on the glass is formed which protects the surfaces with the exception of the reflex surfaces from the action of the boiler water, thereby preventing the disintegration of the glass. The coating prevents rapid changes in temperature and prevents disintegration of the material which forms the gasket, which in this case is the coating material which incases the same.

In so far as I am aware, I am the first in the art to incase a glass in the manner herein described to prevent disintegration of the glass and maintain the glass at a contant thickness and to form a sealing coating which enables one to dispense with the gasket originally employed in connection with the gage glass and it is to be understood that the claims to such a construction are to be interpreted with corresponding scope.

It will now be apparent to those skilled in the art that in cases wherein a double seal is formed, as herein disclosed, a greatly improved result is obtained, since before any leakage can occur the fluid must force its way completely around the glass between the shrouding or incasing coating and between the seal formed between the glass and that portion of the coating which abuts against this casing and by forming a double seal, as herein disclosed, the cutting and chipping of the glass by the action of the steam, water or other fluid being measured, is positively prevented.

It will now be apparent that I have devised a novel and useful construction of a water gage, which embodies the features of advantage enumerated as desirable in the statement of the invention and the above description, and while I have in the present instance shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. As a new article of manufacture, a registering glass for a gage frame, comprising a substantially rectangular shaped bar of solid glass having a reflex face and a sealing metal surrounding the sides and ends of the glass and extending over a portion of the rear face thereof to form a seat and define the registering opening and extending over a portion of the front face to form a seat and define the sight opening.

2. As a new article of manufacture, a registering glass for a gage frame, comprising a substantially rectangular shaped bar of solid glass having reflexes on the rear face and a sealing metal gasket forming therewith a concrete unitary structure, said gasket surrounding the sides and ends of the glass and extending over the front and rear faces thereof to form front and rear seats and define the rear registering face and the front sight face of the gage.

3. As a new article of manufacture, a registering glass for a gage frame, comprising a rectangular bar of solid glass having its ends rounded and its front and rear faces near the outer periphery forming seats, and a sealing metal surrounding the ends and sides of the glass and extending over said seats to form a seat of sealing metal at such places and to define the front sight face and the rear registering face of the glass.

EDWIN P. GROFF.

Witnesses:
H. S. FAIRBANKS,
C. D. McVAY.